(12) United States Patent
Hsu et al.

(10) Patent No.: US 12,554,320 B2
(45) Date of Patent: Feb. 17, 2026

(54) BODY TRACKING METHOD, BODY TRACKING SYSTEM, AND HOST

(71) Applicant: HTC Corporation, Taoyuan (TW)

(72) Inventors: YuHui Hsu, Taoyuan (TW); Yen-Jung Lee, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/760,022

(22) Filed: Jul. 1, 2024

(65) Prior Publication Data

US 2025/0013293 A1 Jan. 9, 2025

Related U.S. Application Data

(60) Provisional application No. 63/524,702, filed on Jul. 3, 2023.

(51) Int. Cl.
*G06F 3/01* (2006.01)
*G06T 7/70* (2017.01)

(52) U.S. Cl.
CPC ............. *G06F 3/012* (2013.01); *G06T 7/70* (2017.01); *G06T 2207/30196* (2013.01)

(58) Field of Classification Search
CPC .... G06F 3/012; G06F 3/011; G06F 2203/012; G06T 7/70; G06T 19/003; G06T 19/006; G06T 2207/30196
See application file for complete search history.

(56) References Cited

U.S. PATENT DOCUMENTS

| | | | |
|---|---|---|---|
| 7,747,409 B2 * | 6/2010 | Ladetto | G06F 3/011 702/150 |
| 9,684,928 B2 * | 6/2017 | Freeman | G06Q 30/0643 |
| 10,030,968 B2 * | 7/2018 | Brunner | G06V 10/267 |
| 11,481,960 B2 * | 10/2022 | Marra | G06T 15/20 |
| 11,507,179 B2 * | 11/2022 | Lefaudeux | G06N 20/00 |
| 2011/0009241 A1 * | 1/2011 | Lane | G06F 3/011 482/8 |
| 2012/0159290 A1 * | 6/2012 | Pulsipher | G06T 7/70 714/E11.024 |
| 2015/0199816 A1 * | 7/2015 | Freeman | G06T 7/74 382/103 |
| 2020/0008712 A1 * | 1/2020 | Takenaka | A61H 3/00 |

* cited by examiner

*Primary Examiner* — Mihir K Rayan
(74) *Attorney, Agent, or Firm* — JCIPRNET

(57) ABSTRACT

A body tracking method is provided. The body tracking method includes: obtaining an environment map of a real world around a user; obtaining tracker data from a tracker, wherein the tracker is adapted to be mounted on a foot or a leg of the user; determining a ground shape of a foot location of the user based on the environment map and the tracker data; determining foot step information of the foot based on the ground shape; and determining a body pose of the user based on the foot step information.

20 Claims, 6 Drawing Sheets

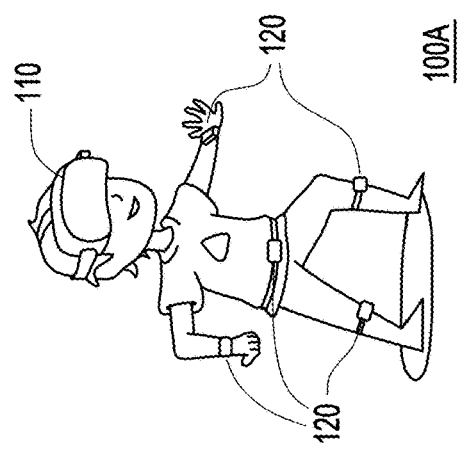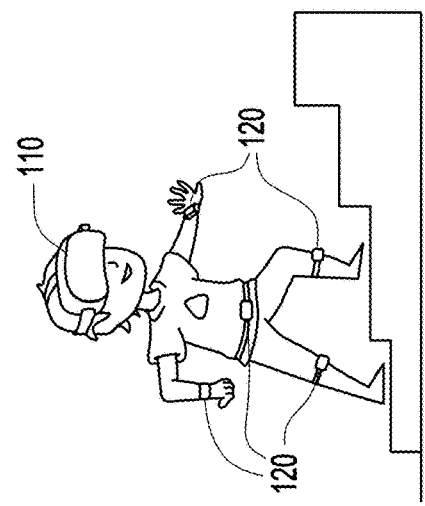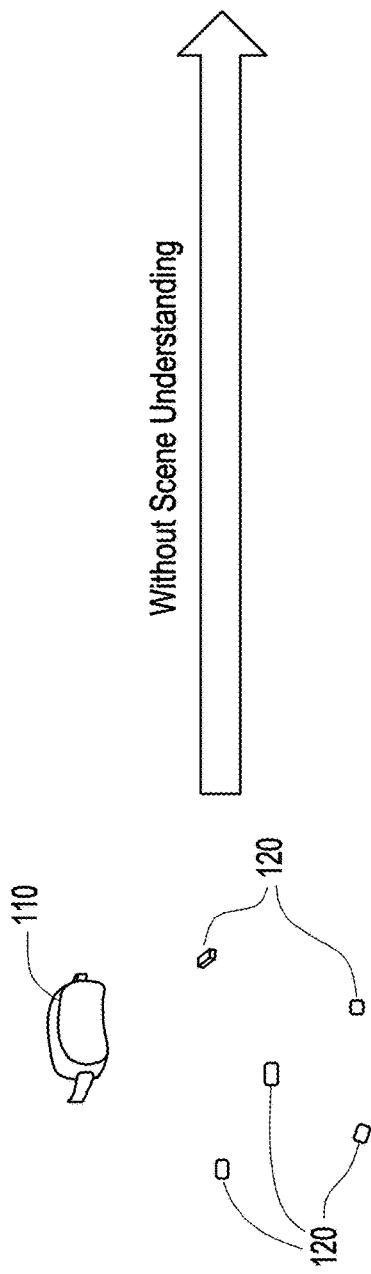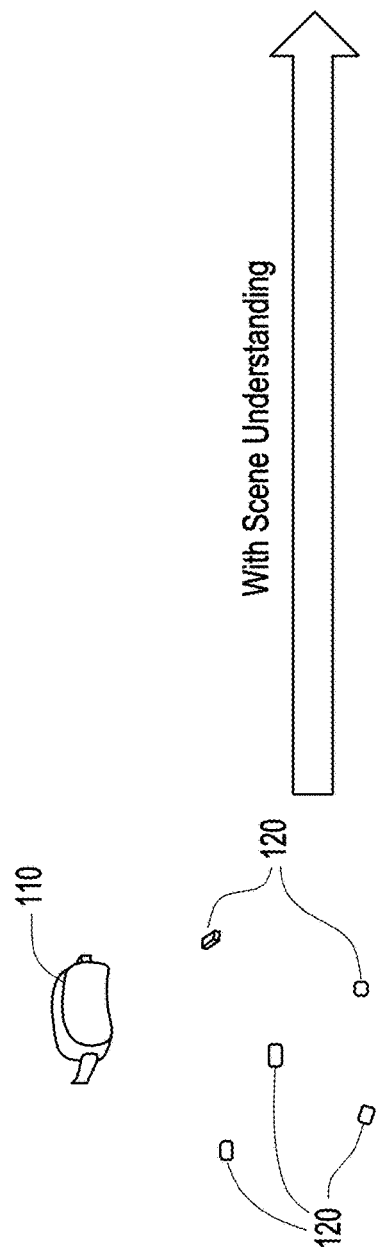
FIG. 1A
FIG. 1B

BODY TRACKING METHOD, BODY TRACKING SYSTEM, AND HOST

CROSS-REFERENCE TO RELATED APPLICATION

This application claims the priority benefit of U.S. provisional application Ser. No. 63/524,702, filed on Jul. 3, 2023. The entirety of the above-mentioned patent application is hereby incorporated by reference herein and made a part of this specification.

BACKGROUND

Technical Field

The disclosure relates to a body tracking method; particularly, the disclosure relates to a body tracking method, a body tracking system, and a host.

Description of Related Art

In order to bring an immersive experience to user, technologies related to extended reality (XR), such as augmented reality (AR), virtual reality (VR), and mixed reality (MR) are constantly being developed. AR technology allows a user to bring virtual elements to the real world. VR technology allows a user to enter a whole new virtual world to experience a different life. MR technology merges the real world and the virtual world. Further, to bring a fully immersive experience to the user, visual content, audio content, or contents of other senses may be provided through one or more devices.

SUMMARY

The disclosure is direct to a body tracking method, a body tracking system, and a host, so as to provide a more accurate body tracking method for all kind of environments in the real world.

The embodiments of the disclosure provide a body tracking method. The body tracking method includes: obtaining an environment map of a real world around a user; obtaining tracker data from a tracker, wherein the tracker is adapted to be mounted on a foot or a leg of the user; determining a ground shape of a foot location of the user based on the environment map and the tracker data; determining foot step information of the foot based on the ground shape; and determining a body pose of the user based on the foot step information.

The embodiments of the disclosure provide a body tracking system. The body tracking system includes a camera, a tracker, and a host. The camera is configured to obtain an environment image of an environment around a user in a real world. The tracker is configured to obtain tracker data and adapted to be mounted on a foot or a leg of the user. The host includes a storage circuit and a processor. The storage circuit is configured to store a program code. The processor is coupled to the storage circuit and accessing the program code to execute: obtaining an environment map of a real world around a user in real time based on the environment image; obtaining tracker data from the tracker; determining a ground shape of a foot location of the user based on the environment map and the tracker data; determining foot step information of the foot based on the ground shape; and determining a body pose of the user based on the foot step information.

The embodiments of the disclosure provide a host. The host includes a storage circuit and a processor. The storage circuit is configured to store a program code. The processor is coupled to the storage circuit and accessing the program code to execute: obtaining an environment map of a real world around a user; obtaining tracker data from a tracker, wherein the tracker is adapted to be mounted on a foot or a leg of the user; determining a ground shape of a foot location of the user based on the environment map and the tracker data; determining foot step information of the foot based on the ground shape; and determining a body pose of the user based on the foot step information.

Based on the above, according to the body tracking method, the body tracking system, and the host, the body pose may be determined accurately no matter what the ground shape is, thereby improving the user experience.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 1A and FIG. 1B are schematic diagrams of two body tracking scenarios according to some embodiments of the disclosure.

DESCRIPTION OF THE EMBODIMENTS

Figure 2:
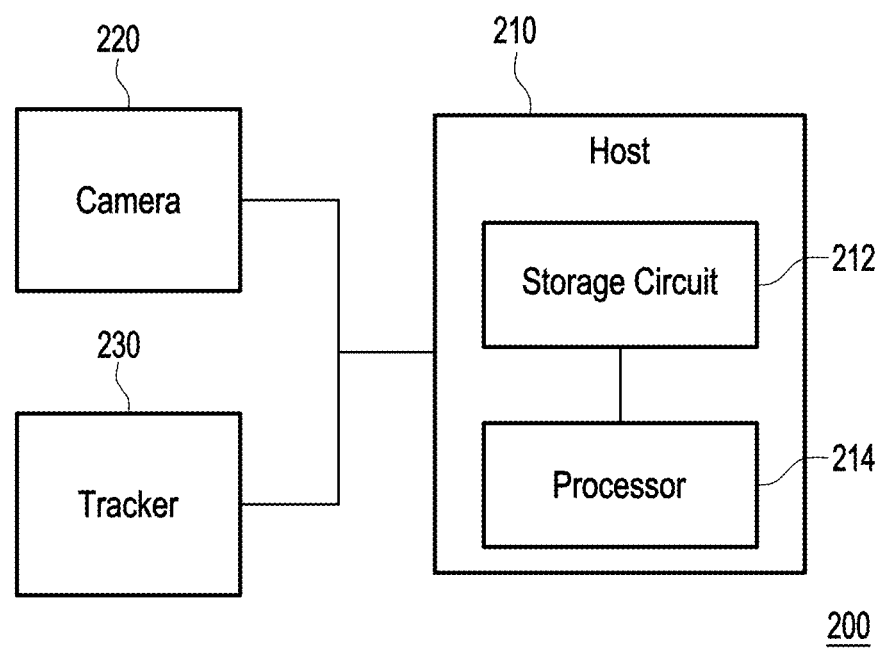
FIG. 2 is a schematic diagram of a body tracking system according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

In order to bring an immersive experience to user, technologies related to XR, such as AR, VR, and MR are constantly being developed. AR technology allows a user to bring virtual elements to the real world. VR technology allows a user to enter a whole new virtual world to experience a different life. MR technology merges the real world and the virtual world. Further, to bring a fully immersive experience to the user, visual content, audio content, or contents of other senses may be provided through one or more devices.

Body tracking may be used to tracking a movement of a user in a real world and a result of the body tracking may be used to determine a movement of an avatar representing the user in the virtual world. It is worth mentioned that, a ground in the real world may not be entirely flat. That is, there may be some ups and downs on the ground. Therefore, when the user is moving in the real world, the user may step on a higher ground or a lower ground occasionally. However, when the ground in the real world is not level, the body tracking may not be able to accurately determine a body pose of the user. Therefore, it is the pursuit of people skilled in the art to provide a more accurate body tracking method for all kind of environments in the real world.

FIG. 1A and FIG. 1B are schematic diagrams of two body tracking scenarios according to some embodiments of the disclosure. With reference to FIG. 1A and FIG. 1B, a head-mounted device (HMD) 110 may be mounted on a head of a user and trackers 120 may be mounted on different parts of the user. For example, as shown in FIG. 1A and FIG. 1B, the trackers 120 may be mounted on a left wrist (left hand), a right wrist (left hand), a waist (torso), a left leg, and a right leg of the user. However, this disclosure is not limited thereto.

Reference is first made to FIG. 1A. FIG. 1A depicts a body tracking scenario 100A without scene understanding. Specifically, the trackers 120 are configured to collect tracker data about the user's movements. The tracker data may include positions and orientations of the body parts of the user, such as the head, torso, and limbs. Then, a body tracking may be performed based on the tracker data to determine a body pose of the user.

However, if the ground in the real world around the user is not level, the body pose of the user may not be able to be accurately determined based on the tracker data. This is because the body tracking will assume that the ground is level, and its calculations will be based on this assumption. As a result, the body pose may appear unnatural and an avatar representing the user utilizing the body pose may look awkward in a virtual world. For example, if the user is standing on a slope, the body tracking may determine that the user is leaning forward. However, in reality, the user may simply be standing upright on the slope.

Reference is now made to FIG. 1B. FIG. 1B depicts a body tracking scenario 100B with scene understanding. Specifically, scene understanding is used to get a better understanding of the environment around the user in the real world. The better understating includes information about the layout of the environment, as well as the position and orientation of objects in the environment, which may be referred to as scene information.

Further, the body tracking may be performed based on not only the tracker data but also the scene information to more accurately determine the body pose of the user. That is, the body tracking may take into account the fact that whether the ground is level or not. As a result, the body pose will be more natural and the avatar representing the user utilizing the body pose may look more authentic in the virtual world. For example, if the user is standing on a slope, the body tracking will determine that the body pose is standing upright on the slope instead of leaning forward. In addition, if the user is standing on a stairs, the body tracking will determine the body pose is standing on a surface of the stairs, rather than the feet floating above the stairs or penetrating the stairs.

In short, scene understanding is a crucial aspect of tracking technology that allows for a more accurate representation of a user's movements and interactions within the environment. Without scene understanding, the body tracking may incorrectly interpret the body pose of the user due to the uneven ground, leading to a distorted representation of the body pose. The distorted representation may not only impact the user experience but also compromise the overall accuracy and reliability of the tracking system. By incorporating scene understanding into the body tracking method, the environment may be analyzed and key features, such as the objects, ground surface and obstacles, may be identified. That is, the scene understanding may enable the body tracking method to provide more precise and realistic body tracking data.

FIG. 2 is a schematic diagram of a body tracking system according to an embodiment of the disclosure. With reference to FIG. 2, a body tracking system 200 may include a host 210, a camera 220, and a tracker 230. In one embodiment, as shown in FIG. 2, the host 210, the camera 220, and the tracker 230 may be disposed separately. In another embodiment, the host 210 may be integrated with the camera 220 or the tracker 230. However, this disclosure is not limited thereto. Further, for purposes of simplicity, the body tracking system 200 is depicted that including one tracker 230. However, a number of the tracker 230 in the body tracking system 200 may be one or more. That is, this disclosure does not limit the number of the tracker 230.

In addition, the tracker 230 may be same as the trackers 120. That is, the tracker 230 may be adapted to be mounted on one body part of the user, for determining a pose of the one body part. Further, the HMD 110 may also include a tracker 230, for determining head data of the user. The head data may include positions and orientations of the head of the user. That is, a body tracking may be performed based on the head data to determine a head pose of the user.

In various embodiments, the host 210 may be any smart device and/or computer device. In some embodiments, the host 210 may be any electronic device capable of providing reality services (e.g., AR/VR/MR services, or the like). In some embodiments, the host 210 may be implemented as an XR device, such as a pair of AR/VR glasses and/or the HMD 110. In some embodiments, the host 210 may be a computer and/or a server, and the host 210 may provide the computed results (e.g., AR/VR/MR contents) to a display device(s), such that the display device(s) may show the computed results to the user. However, this disclosure is not limited thereto.

In some embodiments, the HMD 110 may include a display module and the display module may include, for example, an organic light-emitting diode (OLED) display device, a mini LED display device, a micro LED display device, a quantum dot (QD) LED display device, a liquid-crystal display (LCD) device, a tiled display device, a foldable display device, or an electronic paper display (EPD). However, the disclosure is not limited thereto.

The host 210 includes a storage circuit 212 and a processor 214. The storage circuit 212 is one or a combination of a stationary or mobile random access memory (RAM), read-only memory (ROM), flash memory, hard disk, or any other similar device, and which records a plurality of modules and/or a program code that can be executed by the processor 214.

The processor 214 may be coupled with the storage circuit 212, and the processor 214 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, or the like.

In some embodiments, the host 210 may further coupled to the camera 220. The camera 220 may be configured to obtain an environment image of the environment around the user in the real world, wherein a plurality of the environmental images may form a panorama and/or cubemaps, but the disclosure is not limited thereto. The camera 220 may be, for example, a complementary metal oxide semiconductor (CMOS) camera, a charge coupled device (CCD) camera, a light detection and ranging (LiDAR) device, a radar, an infrared sensor, an ultrasonic sensor, a depth camera, other similar devices, or a combination of these devices. In some embodiments, the camera 220 may be disposed on the HMD 110, the tracker 120, wearable glasses (e.g., AR/VR goggles), an electronic device, other similar devices, or a combination of these devices. However, this disclosure is not limited thereto.

In some embodiments, the host 210 may further coupled to the tracker 230. The tracker 230 may be configured to be mounted on one body part of the user. For example, the body part may include a left wrist, a right wrist, a waist, a left leg, or a right leg of the user, but is not limited thereto. The tracker 230 may include, for example, a gyroscope, an accelerometer, an inertial measurement unit (IMU) sensor, other similar devices, or a combination of these devices. However, this disclosure is not limited thereto.

In some embodiments, the host 210, camera 220, and/or tracker 230 may further include a communication circuit and the communication circuit may include, for example, a wired network module, a wireless network module, a Bluetooth module, an infrared module, a radio frequency identification (RFID) module, a Zigbee network module, or a near field communication (NFC) network module, but the disclosure is not limited thereto. That is, the host 210 may communicate with external device(s) (such as the camera 220, the tracker 230, a display . . . etc.) through either wired communication or wireless communication.

In the embodiments of the disclosure, the processor 214 may access the modules and/or the program code stored in the storage circuit 212 to implement the body tracking method provided in the disclosure, which would be further discussed in the following.

Figure 3A:
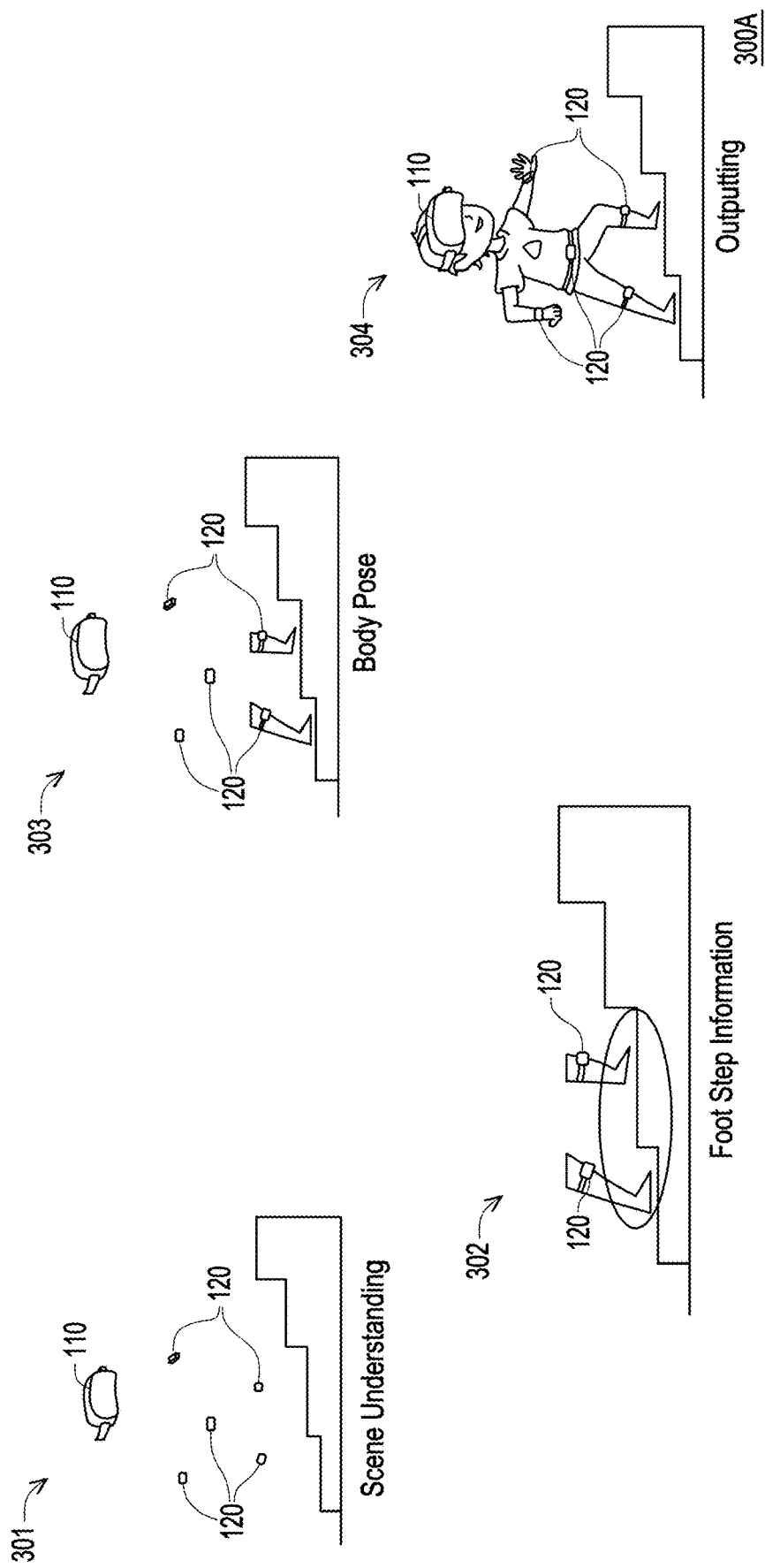
FIG. 3A is a schematic diagram of a body tracking scenario according to one embodiment of the disclosure.

FIG. 3A is a schematic diagram of a body tracking scenario according to one embodiment of the disclosure. In FIG. 3A, a body tracking scenario 300A includes scenarios 301-304. Similar as the body tracking scenario 100A in FIG. 1A and the body tracking scenario 100B in FIG. 1B, the trackers 120 may be mounted on a left wrist, a right wrist, a waist, a left leg, and a right leg of the user. However, this disclosure is not limited thereto.

Reference is made to FIG. 3A. In the scenario 301, scene understating may be performed to obtain an environment map of the environment around the user in the real world. That is, the environment map may be obtained based on a scene understating algorithm and the environment map may include a plurality of scene meshes. In one embodiment, a scene mesh is a digital representation of a 3D geometry of the environment. For example, the plurality of scene meshes together may be like a digital blueprint that captures the shapes and positions of objects (including the ground) within the environment.

In one embodiment, the environment map may be obtained in real time through the camera 220 based on the scene understating algorithm. For example, the camera 220 may be integrated with the HMD 110 or one of the trackers 120 and the camera 220 may be configured to obtain environment images of the environment. However, this disclosure is not limited thereto. In another embodiment, the environment map may be pre-stored in a map database and the environment map may be obtained from the map database, rather than obtaining the environment map in real time.

In the scenario 302, after the environment map is obtained, a foot location of a foot of the user in the environment may be determined based on the environment map and the tracker data of the tracker 120 on the foot. In one embodiment, the tracker 120 on the foot may be referred to as a foot tracker and the tracker data of the foot tracker may be referred to as foot tracker data. Therefore, since the foot location in the environment is known and a ground location of a ground that the foot is stepping on may be same as the foot location, a ground shape of the ground the foot is stepping on may be determined based on the scene meshes of the environment map and the ground location. Further, based on the ground shape, how the foot is disposed on ground may be determined. That is, foot step information may be determined based on the ground shape. For example, the foot step information may include a stepping foot shape (e.g., the position and an orientation) of the foot on the ground location and a position and orientation relationship between the foot and the ground. In other words, the foot step information may include a foot pose of the user determined based on the ground shape of the foot location of the user determined based on the environment map and the tracker data.

In one embodiment, a foot step model may be pre-trained to determine the foot step information. That is, different kinds of ground shapes, such as an uphill, a downhill, a stairs, a flat ground . . . etc., may be used to pre-train the foot step model. Therefore, by inputting a ground shape into the foot step model, the foot step information may be determined based on the foot step model. However, this disclosure is not limited thereto.

It is noted that, the foot step information may be utilized to optimize another foot pose (e.g., part of a body pose) of the user determined based on a foot tracking (e.g., part of a body tracking). In one embodiment, the another foot pose may be determined by performing the foot tracking based on the foot tracker data from the foot tracker and/or other tracker data from other trackers 120 on other body parts. For example, the foot tracking may be configured to obtain a position and an orientation of the foot based on an inverse kinematics algorithm utilizing some or all the tracker data. That is, the foot pose may be determined based on the tracker data. Then, based on the foot pose determined based on the tracker data and the foot pose determined based on the ground shape, an optimized foot pose may be obtained to make sure that the foot pose looks authentic and the foot fits with the ground shape of the ground at the same time. In other words, the foot pose determined based on the foot tracking may be optimized based on the foot step information. Further details of the optimization of the foot pose will be explained in detail below with further reference to the scenario 303.

In the scenario 303, after the foot step information is determined, the body tracking may be performed based on the foot step information and the tracker data from all the trackers 120 (including foot tracker data from the foot trackers 120 on the feet, other tracker data from other trackers 120 on other body parts, and/or head data from the HMD 110). The body pose may be determined based on the body tracking. For example, the body pose (including the foot pose) is obtained by utilizing an inside-out algorithm, such as a simultaneous localization and mapping (SLAM) algorithm based on the tracker data, such as camera images. Specifically, since the foot step information is determined, a foot pose may be determined based on the foot step information and/or the foot tracker data. Further, the foot pose is one part of the body pose. Therefore, the foot pose may be used as a clue to solve the rest of the parts of the body pose (e.g., torso pose, hand pose, head pose . . . etc.). In other words, from bottom to top, starting from the foot pose based on the foot step information, the body pose may be determined. That is, the body pose may be determined starting from the foot of the user, and the body pose may be optimized based on the foot step information.

In the scenario 304, after the body pose is determined, the body pose may be outputted to determine and display an avatar pose of an avatar representing the user in the virtual world. In one embodiment, a virtual environment in the virtual world may be same as the environment in the real world. That is, the virtual environment may be a realistic recreation of the real-world environment, allowing user to perform various actions in the virtual world as if the user was in the real world. For example, while the user steps on a stair in the real world, the avatar may also step on a virtual stair in the virtual world. Notably, since the body pose is determined correctly, the avatar pose may be more natural, thereby increasing the immersive experience.

In another embodiment, the virtual environment in the virtual world may be different from the environment in the real world. That is, objects and ground surfaces of different areas in the real world may be different from virtual objects and virtual ground surfaces of different areas in the virtual world. For example, while the user steps on a stair in the real world, the avatar may step on a virtual flat ground in the virtual world. When the user steps on a flat ground in the real world, the avatar may step on a virtual stair in the virtual world. Notably, since the body pose is determined starting from the foot pose, the avatar pose may be also determined starting from a virtual foot pose. Therefore, even though a ground shape of a ground in the real world and a virtual ground shape of a virtual ground are different, the avatar may be still able to step on the virtual ground, rather than the feet floating above virtual ground or penetrating the virtual ground. That is, the ground is aligned with the virtual ground without complicated analysing processes, thereby improving the user experience. However, in yet another embodiment, in an AR application, the avatar may be configured to represent a real pose of the user in a displayed real world (i.e., the virtual world). That is, the user may see displayed real feet (i.e., the virtual feet of the avatar) stepping on a displayed real ground (i.e., virtual ground) through a display device. In other words, the displayed real feet of the avatar may be still able to step on the displayed real ground, rather than floating above the displayed real ground.

It is worth mentioned that, the foot location is determined based on the environment map and the foot tracker data. That is, there is no need to obtain an image of the foot and the ground for determining the relationship between the foot and the ground. Therefore, the requirement of the body tracking may be decreased, thereby improving the performance of the body tracking.

Figure 3B:
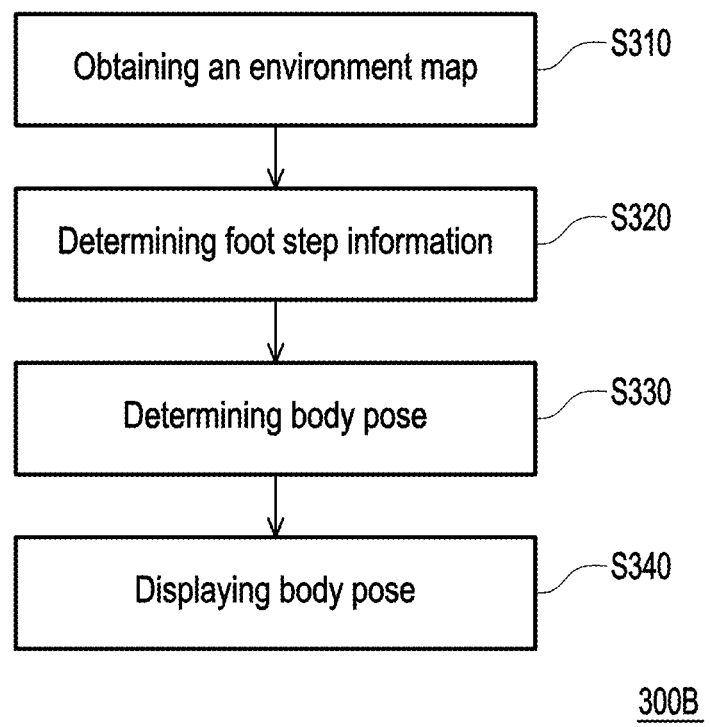
FIG. 3B is a schematic flowchart of a body tracking method according to one embodiment of the disclosure.

FIG. 3B is a schematic flowchart of a body tracking method according to one embodiment of the disclosure. In FIG. 3B, a body tracking method 300B includes exemplary steps S310-S340 corresponding to the scenarios 301-304 in FIG. 3A. The method of this embodiment may be executed by the host 210 in FIG. 2. However, this disclosure is not limited thereto. In addition, the implementation details of the body tracking method 300B may be referred to the descriptions of FIG. 3A to obtain sufficient teachings, suggestions, and implementation embodiments, while the details are not redundantly described seriatim herein.

Reference is made to FIG. 2, FIG. 3A, and FIG. 3B. In the step S310, the environment map may be obtained in real time by the camera 220, as shown in the scenario 301. In the step S320, the foot step information may be determined by the processor 214 based on the environment map and foot location information, as shown in the scenario 302. For example, the foot location information may include a foot location determined based on the foot tracker data and/or a foot location determined based on an image obtained by the trackers 120. It is noted that, the image does not have to include the foot and the ground surface at the same time. The image just has to include enough information for identify a foot location of the foot in the environment map.

In the step S330, the body pose of the user may be determined by the processor 214 based on the environment map and the foot step information, as shown in the scenario 303. In the step S340, the body pose may be displayed by the HMD 110, as shown in the scenario 304. In this manner, the body pose may be determined accurately no matter what the ground shape is, thereby improving the user experience.

Figure 4A:
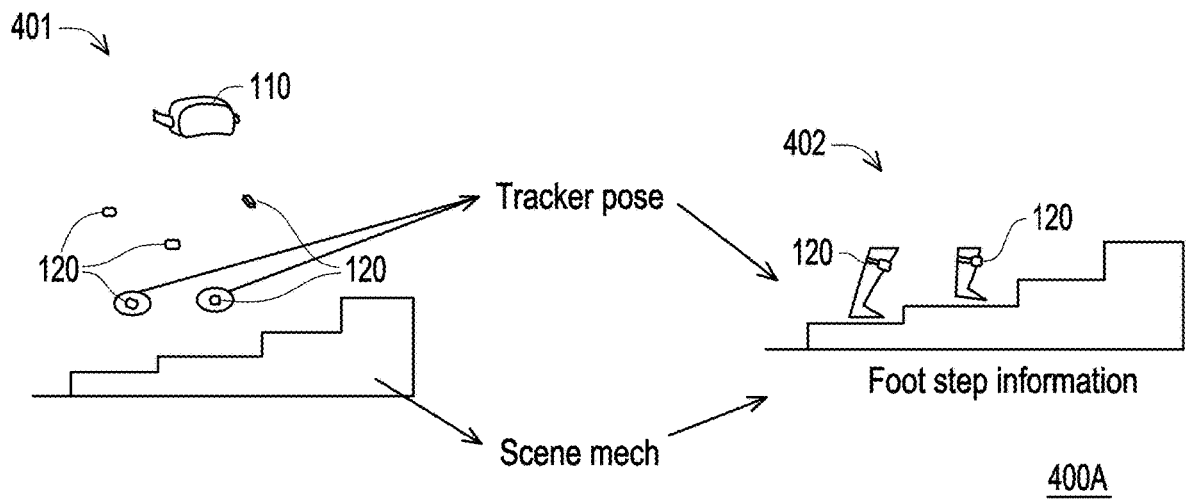
FIG. 4A is a schematic diagram of a body tracking scenario according to one embodiment of the disclosure.
Figure 4B:
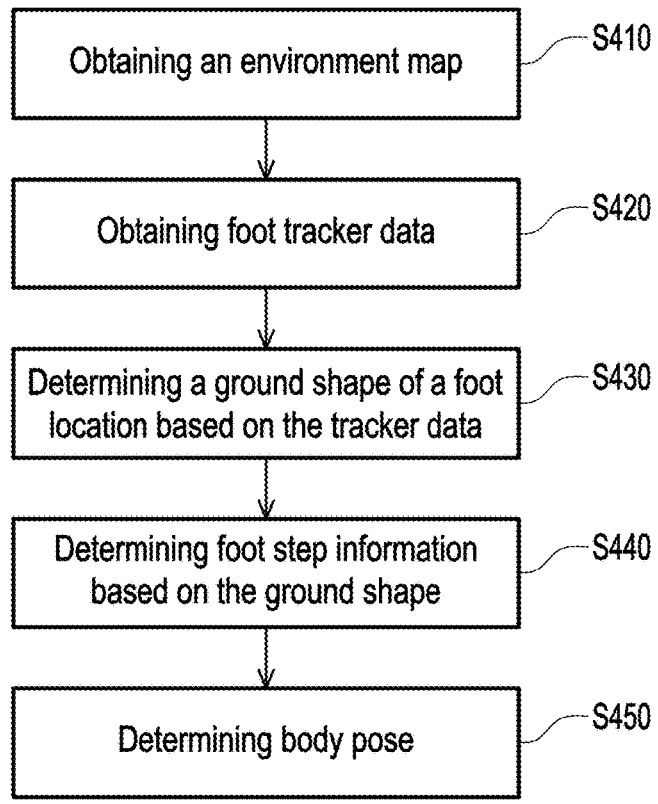
FIG. 4B is a schematic flowchart of a body tracking method according to one embodiment of the disclosure.

FIG. 4A is a schematic diagram of a body tracking scenario according to one embodiment of the disclosure. FIG. 4B is a schematic flowchart of a body tracking method according to one embodiment of the disclosure. In FIG. 4A, a body tracking scenario 400A is an exemplary embodiment of the scenario 302 or the step S320 for determining the foot step information. In FIG. 4B, a body tracking method 400B include steps S410-S450. The steps S410, S450 may be same as the steps S310, S340 in FIG. 3B, respectively and the steps S420-S440 may be one exemplary embodiment of detail steps of the scenario 302 or the step S320 for determining the foot step information. However, this disclosure is not limited thereto.

In addition, the implementation details of the body tracking method 400B may be referred to the descriptions of FIG. 3A to obtain sufficient teachings, suggestions, and implementation embodiments, while the details are not redundantly described seriatim herein.

Reference is made to FIG. 2 to FIG. 4B. In the step S410, the environment map is obtained. Further, the environment map may be obtained based on a scene understating algorithm and the environment map may include a plurality of scene meshes. Each of the scene meshes may belong to an object of the environment around the user or a ground of an area within the environment. For example, as shown in a scenario 401 in FIG. 4A, the user may stand on a stairs and a scene mesh may be configured to represent the stairs.

In the step S420, the tracker data is obtained from trackers 120 and/or the head data is obtained from a tracker 230 of the HMD 110. The processor 214 may be configured to determine a pose for each of the trackers 120 and/or for the HMD 110 based on the tracker data or the head data, respectively. For example, a tracker pose may be determined for each of the trackers 120 and/or a HMD pose may be determined for the HMD 110. Further, because each of the trackers 120 and the HMD 110 is adapted to be worn on one part of the user, as shown in the scenario 401, a pose of each of the trackers 120 and the HMD 110 may be considered as a pose of the one part of the user.

For example, the HMD pose may be considered as the head pose of the user. The tracker pose of the tracker on a left hand of the user may be considered as a left hand pose of the user. The tracker pose of the tracker on a right hand of the user may be considered as a right hand pose of the user. The tracker pose of the tracker on a torso of the user may be considered as a torso pose of the user. The tracker pose of the tracker on a left foot of the user may be considered as a left foot pose of the user. The tracker pose of the tracker on a right foot of the user may be considered as a right foot pose of the user. However, this disclosure is not limited thereto.

In the step S430, after the poses of each of the trackers 120 and the HMD 110 are determined, a location of each of the trackers 120 and the HMD 110 may be determined based on the environment map. For example, a left foot location in the environment map may be determined based on the left foot pose and the environment map. Similarly, a right foot location in the environment map may be determined based on the right foot pose and the environment map, and so on. Further, based on a foot location (e.g., the left foot location or the right foot location), a user location where the user is located in the environment map may be determined (e.g., same as the foot location or close to foot location). That is, the foot location or the user location may be configured to represent that the user may be located on a ground of an area in the environment. Based on the foot location or the user location and the environment map, a ground shape of the ground (where the user may be located on) may be determined. As shown in a scenario 402 in FIG. 4A, a scene mesh of a plurality of scene meshes may be configured to represent the ground shape. That is, the processor 214 may be configured to determine one of the plurality of scene meshes in the environment map as the ground shape based on the tracker data.

In the step S440, based on the scene mesh (represent the ground shape), the foot step information may be determined. For example, the foot step information may include a position and an orientation of the foot and a position and orientation relationship between the foot and the ground. That is, the foot pose may be also determined based on the foot step information. Notably, because the foot pose is determined based on the scene mesh, the foot pose may be properly disposed on the ground, rather than the foot floating above ground or penetrating the ground.

In the step S450, based on the foot pose, a body tracking may be performed and a (full) body pose of the user may be determined based on the body tracking. In this manner, the body pose may be determined accurately no matter what the ground shape is, thereby improving the user experience.

Figure 5:
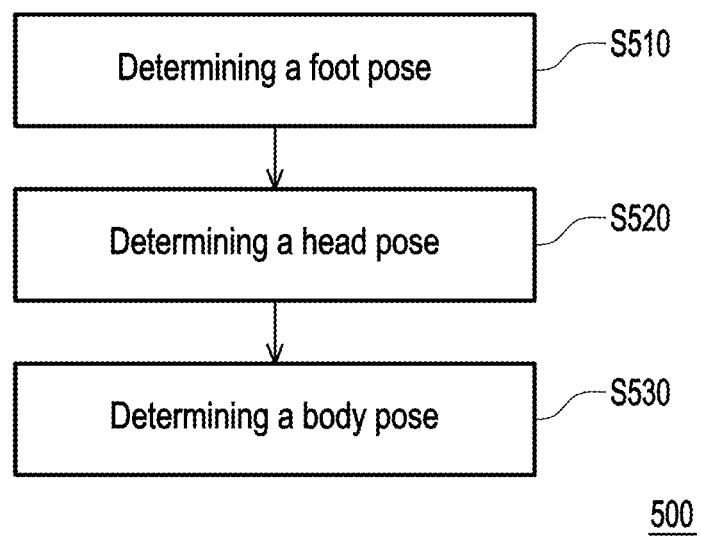
FIG. 5 is a schematic flowchart of a body tracking method according to one embodiment of the disclosure.

FIG. 5 is a schematic flowchart of a body tracking method according to one embodiment of the disclosure. In FIG. 5, a body tracking method 500 include steps S510-S530. The steps S510-S530 may be one exemplary embodiment of detail steps of the scenario 303, the step S330, or the step S450 for determining the body pose. However, this disclosure is not limited thereto.

In addition, the implementation details of the body tracking method 500 may be referred to the descriptions of FIG. 3A to obtain sufficient teachings, suggestions, and implementation embodiments, while the details are not redundantly described seriatim herein.

In the step S510, the foot pose may be determined based on the foot step information. It is noted that, the foot pose may be used as a clue to solve the rest of the parts of the body pose (e.g., torso pose, hand pose, head pose . . . etc.). In other words, starting from the foot pose based on the step information, the body pose may be determined.

In the step S520, the head pose may be determined based on head data from a tracker 230 in the HMD 110. It is noted that, the foot pose may be used as one end of the body pose of the user and the head pose may be used as the other end of the pose. That is, a height or a contour of the body pose may be determined based on the foot pose and the head pose.

In the step S530, based on the foot pose and the head pose, a body tracking may be performed to determine a (full) body pose of the user. Because the height or the contour of the body pose is determined, the body pose determined by the body tracking may be more accurate, thereby increasing the immerse experience.

In summary, according to the body tracking method 300B, 400B, 500, the body tracking system 200, and the host 210, because the foot step information is determined based on the ground shape of the environment, the foot pose may be properly disposed on the ground, rather than the foot floating above ground or penetrating the ground. In this manner, the body pose may be determined accurately no matter what the ground shape is, thereby improving the user experience.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A body tracking method, comprising:
    obtaining an environment map of a real world around a user;
    obtaining tracker data from a tracker, wherein the tracker is adapted to be mounted on a foot or a leg of the user;
    determining a foot location of the foot of the user based on the environment map and the tracker data;
    determining a ground shape of the foot location of the user based on the environment map and a ground location, wherein the ground shape is a shape of a ground that the foot is stepping on;
    determining foot step information including a stepping foot shape of the foot on the ground location based on the ground shape; and
    determining a body pose of the user based on the foot step information.

2. The body tracking method according to claim 1, further comprising:
    obtaining the environment map based on a scene understating algorithm, wherein the environment map comprises a plurality of scene meshes.

3. The body tracking method according to claim 2, further comprising:
    determining one of the plurality of scene meshes as the ground shape based on the tracker data.

4. The body tracking method according to claim 1, further comprising:
    obtaining the environment map in real time through a camera.

5. The body tracking method according to claim 4, wherein the camera is disposed on the tracker.

6. The body tracking method according to claim 1, further comprising:
    determining the body pose starting from the foot of the user.

7. The body tracking method according to claim 1, further comprising:
    determining a foot pose based on the tracker data;
    determining a head pose of a head of the user based on head data from a head-mounted device, wherein the head-mounted device is adapted to be mounted on the head; and
    determining the body pose based on the foot pose and the head pose.

8. The body tracking method according to claim 1, further comprising:
    performing a body tracking based on the foot step information; and
    determining the body pose based on the body tracking.

9. The body tracking method according to claim 1, further comprising:
inputting the ground shape into a foot step model; and
determining the foot step information based on the foot step model.

10. The body tracking method according to claim 1, further comprising:
obtaining the body pose based on an inside-out algorithm and the tracker data; and
optimizing the body pose based on the foot step information.

11. A body tracking system, comprising:
a camera, configured to obtain an environment image of an environment around a user in a real world;
a tracker, configured to obtain tracker data and adapted to be mounted on a foot or a leg of the user; and
a host, comprising:
a storage circuit, configured to store a program code; and
a processor, coupled to the storage circuit and accessing the program code to execute:
obtaining an environment map of the real world around the user in real time base on the environment image;
obtaining tracker data from the tracker;
determining a foot location of the foot of the user based on the environment map and the tracker data;
determining a ground shape of the foot location of the user based on the environment map and a ground location, wherein the ground shape is a shape of a ground that the foot is stepping on;
determining foot step information including a stepping foot shape of the foot on the ground location based on the ground shape; and
determining a body pose of the user based on the foot step information.

12. The body tracking system according to claim 11, wherein the processor is further configured to access the program code to execute:
obtaining the environment map based on a scene understating algorithm, wherein the environment map comprises a plurality of scene meshes.

13. The body tracking system according to claim 12, wherein the processor is further configured to access the program code to execute:
determining one of the plurality of scene meshes as the ground shape based on the tracker data.

14. The body tracking system according to claim 11, wherein the camera is disposed on the tracker.

15. The body tracking system according to claim 11, wherein the processor is further configured to access the program code to execute:
determining the body pose starting from the foot of the user.

16. The body tracking system according to claim 11, wherein the processor is further configured to access the program code to execute:
determining a foot pose based on the tracker data;
determining a head pose of a head of the user based on head data from a head-mounted device, wherein the head-mounted device is adapted to be mounted on the head; and
determining the body pose based on the foot pose and the head pose.

17. The body tracking system according to claim 11, wherein the processor is further configured to access the program code to execute:
performing a body tracking based on the foot step information; and
determining the body pose based on the body tracking.

18. The body tracking system according to claim 11, wherein the processor is further configured to access the program code to execute:
inputting the ground shape into a foot step model; and
determining the foot step information based on the foot step model.

19. The body tracking system according to claim 11, wherein the processor is further configured to access the program code to execute:
obtaining the body pose based on an inside-out algorithm; and
optimizing the body pose based on the foot step information.

20. A host, comprising:
a storage circuit, configured to store a program code; and
a processor, coupled to the storage circuit and accessing the program code to execute:
obtaining an environment map of a real world around a user;
obtaining tracker data from a tracker, wherein the tracker is adapted to be mounted on a foot or a leg of the user;
determining a foot location of the foot of the user based on the environment map and the tracker data;
determining a ground shape of the foot location of the user based on the environment map and a ground location, wherein the ground shape is a shape of a ground that the foot is stepping on;
determining foot step information including a stepping foot shape of the foot on the ground location based on the ground shape; and
determining a body pose of the user based on the foot step information.

* * * * *